United States Patent [19]

Freer

[11] 4,106,376

[45] Aug. 15, 1978

[54] REPLACEABLE ROTATING WORKPIECE SPINDLE WITH NORMALLY CLOSED COLLET

[76] Inventor: Edgar P. Freer, 7000 Scarborough Peak Dr., Canoga Park, Calif. 91307

[21] Appl. No.: 678,221

[22] Filed: Apr. 19, 1976

[51] Int. Cl.² .......................... B23B 19/02; B23B 19/00
[52] U.S. Cl. .............................................. 82/30; 82/3; 82/28 R
[58] Field of Search ..................... 82/30, 3; 279/4, 50, 279/43

[56] References Cited

U.S. PATENT DOCUMENTS

| 2,505,643 | 4/1950 | Marsilius | 82/30 X |
| 2,586,126 | 2/1952 | von Zelewsky | 82/30 |
| 3,289,504 | 12/1966 | Bergonzo | 279/4 X |
| 3,690,687 | 9/1972 | Moe | 279/4 |
| 3,741,572 | 6/1973 | Memoto et al. | 279/50 |
| 3,933,061 | 1/1976 | Link | 82/30 |

FOREIGN PATENT DOCUMENTS 1,392,958  5/1975  United Kingdom ..................... 82/30

*Primary Examiner*—Leonidas Vlachos
*Attorney, Agent, or Firm*—Allan M. Shapiro

[57] ABSTRACT

Spindle carrier is indexed from work station to work station and carries a plurality of spindle assemblies with work carrying collets from station to station. Each spindle assembly is adjustably mounted with respect to the spindle carrier and each collet is spring-loaded against a face to maintain the collet at a reference position and each collet is spring-loaded toward the closed position so that it is normally closed without application of an operating force. During indexing which causes engagement of a spindle with the spindle drive belt, the peripheral speed of the spindle drive pulley is substantially matched with the peripheral speed of the belt to provide smooth acceleration.

7 Claims, 5 Drawing Figures

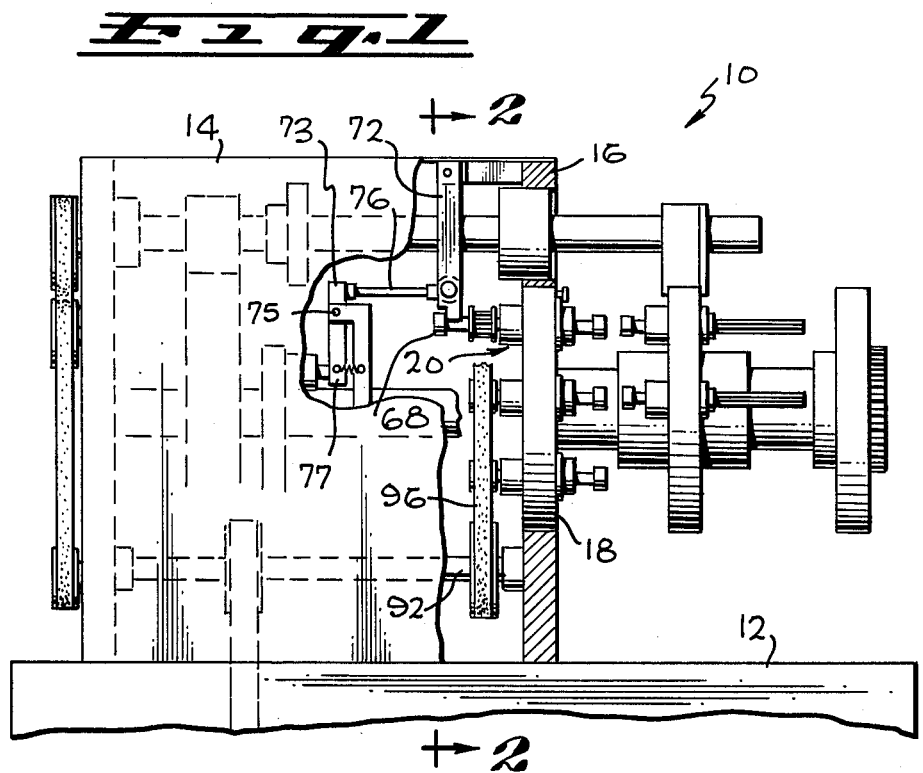
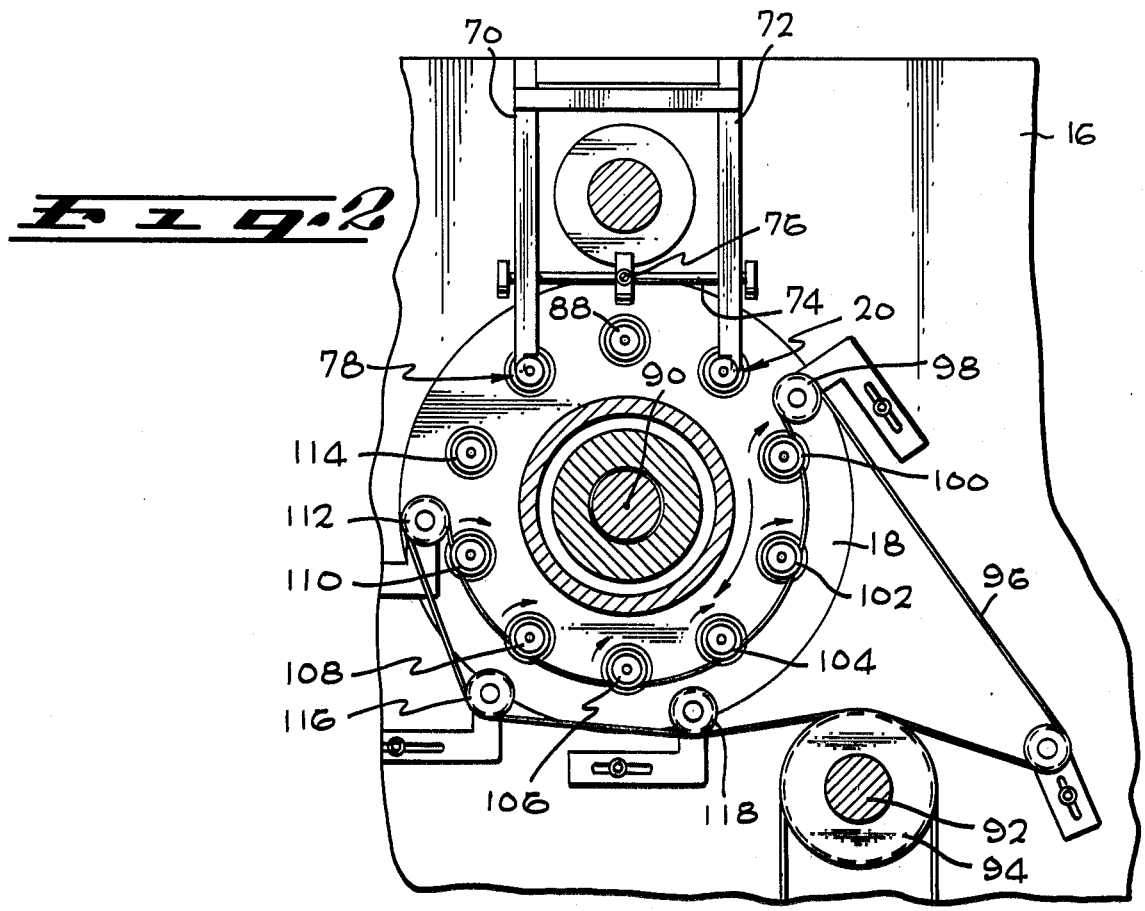

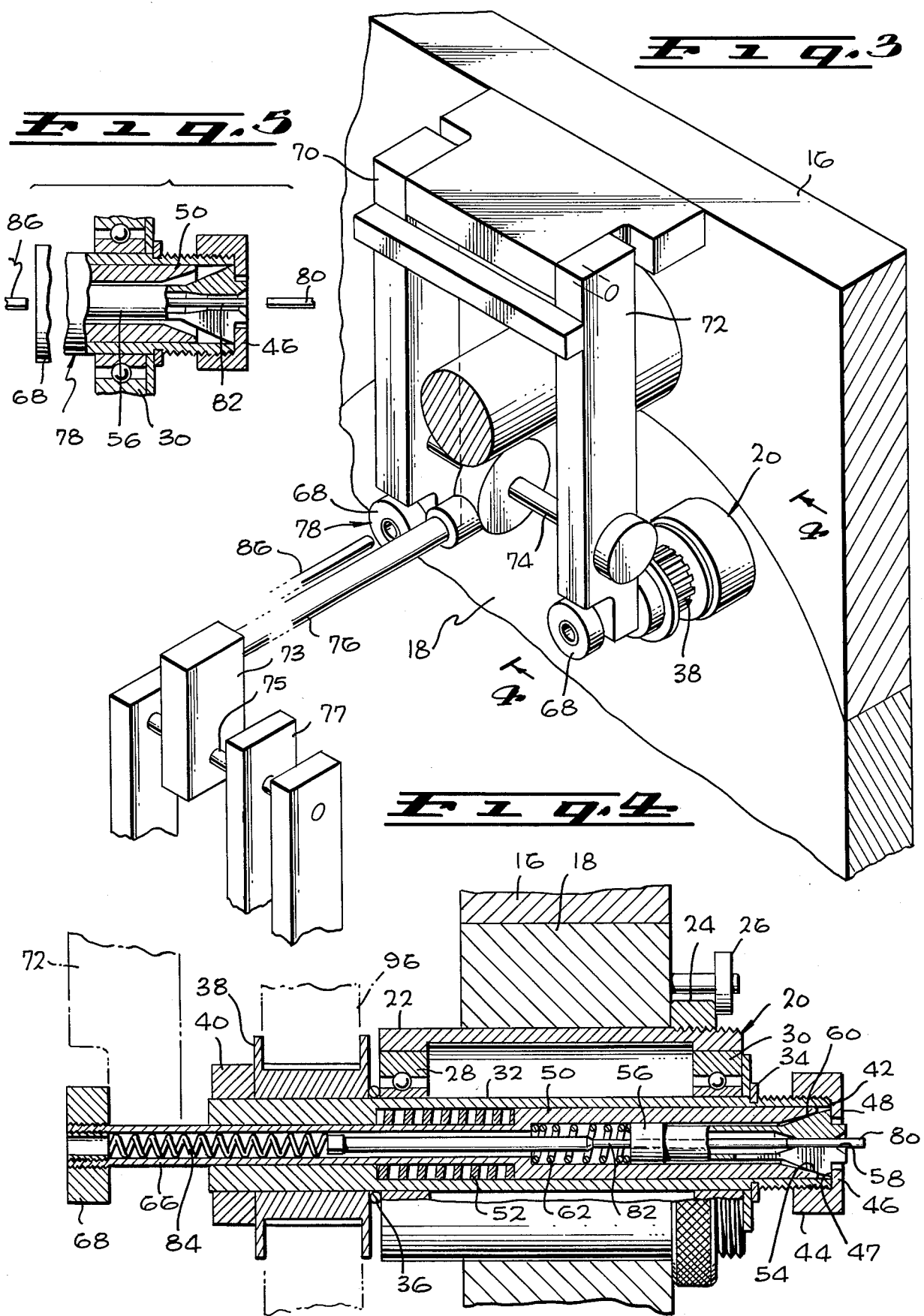

REPLACEABLE ROTATING WORKPIECE SPINDLE WITH NORMALLY CLOSED COLLET

BACKGROUND OF THE INVENTION

1. Field of the Invention

This invention is directed to a replaceable rotating workpiece spindle with normally closed collet, particularly for multiple spindle machines where the workpiece carrying spindles are individually rotated and are indexed to work stations where work is performed on the workpiece.

2. Description of the Prior Art

Machine tools in which there are multiple spindles indexed from one position to another are well-known. A workpiece is carried on each of the spindles and is indexed from a loading position through a series of work stations to an unloading position. In some cases, the work is roated while the tools are held stationary, while in some machines the opposite is true.

When rotating workpiece-carrying spindles are employed, the prior machinery has been limited in its accuracy capabilities because it lacks suitable adjustment of spindle positioning and also lacks the capability of automatically holding the workpiece collet in the proper position with respect to a reference position to which the tooling could be set. Without accurate repetitive positioning of the collet with respect to a reference plane, tooling cannot accurately operate on a workpiece held therein.

Additionally, a problem has arisen in such multiple spindle machine tools because the spindle drive belt has a tendency toward excessive wear due to engagement of the spindle by the moving belt, with a substantial velocity difference, to cause excessive belt wear. Thus, prior equipment has not reached optimum accuracy and has needed extra adjustment due to belt wear.

SUMMARY OF THE INVENTION

In order to aid in the understanding of this invention, it can be stated in essentially summary form that it is directed to a multiple spindle machine tool having rotatable collets for carrying workpieces positioned so that they are spring-urged against a reference stop and are spring-urged toward the closed collet position so that the collet can repetitively, accurately hold the workpiece for rotation and machining thereof.

It is thus an object of this invention to provide a multiple spindle machine tool having the capability of repetitively accurately locating each collet with respect to a tooling reference plane so that work can be repetitively accurately located. It is another object to provide a multiple spindle structure whereby each spindle is individually adjustable with respect to a reference plane. It is another object to provide a collet in each spindle with the collet being spring-urged against a stop face and being spring-urged toward the closed position so that the collet is closed about the workpiece as it is pressed against the stop. It is another object to provide a collet which is spring-urged into the closed position so that it remains closed when there is no collet operating force applied. It is a further object to provide a rotating workpiece spindle structure which is replaceable so that, as spindle maintenance is required, the spindle can be removed and replaced to minimize machine downtime while the spindle is being overhauled.

The features of the present invention which are believed to be novel are set forth with particularity in the appended claims. The present invention, both as to its organization and manner of operation, together with further objects and advantages thereof, may be best understood by reference to the following description taken in conjunction with the accompanying drawings.

BRIEF DESCRIPTION OF THE DRAWINGS

FIG. 1 is a side elevational view of a portion of a machine tool having the replaceable rotating workpiece spindle of this invention, with parts broken away and parts taken in section to show the spindle drive mechanism, as well as the spindle mounting in the spindle carrier.

FIG. 2 is an enlarged view, with parts broken away, as seen generally from along the line 2—2 of FIG. 1.

FIG. 3 is an isometric view of the inside of the spindle carrier showing the loading and unloading stations of spindles in the spindle carrier.

FIG. 4 is an enlarged section taken generally along the line 4—4 of FIG. 3.

FIG. 5 is a section similar to FIG. 4, with parts broken away, showing the collet in the released position.

DESCRIPTION OF THE PREFERRED EMBODIMENT

The machine tool which has as an essential part thereof the replaceable rotating workpiece spindle of this invention is generally indicated at 10 in FIG. 1. Machine tool 10 includes bed 12 to which the various parts are attached for rigidity. Headstock 14 is a major one of these parts and supports various of the moving parts. Front wall 16 rotatably supports spindle carrier 18. Spindle carrier 18 supports a plurality of replaceable rotating workpiece spindles, one of which is indicated at 20. A plurality of identical spindles are spaced equiangularly around the axis of spindle carrier 18 and are located at equal radii from that axis. As seen in FIGS. 2 and 3, spindle 20 is located at the position where a new workpiece is loaded therein. The manner of loading and unloading workpieces from the spindle will be discussed in more detail below.

As is best seen in FIGS. 4 and 5, the entire replaceable rotating workpiece spindle assembly has been indicated by the reference character 20. The spindle assembly 20 includes spindle housing 22 which has an accurately ground exterior cylindrical surface. The forward end carries adjustment ring 24 which is held in place by retainer 26. Housing 22 fits closely within a suitable opening in spindle carrier 18 so that the axial position of housing 22 can be adjusted by rotation of ring 24 on housing 22. When suitably axially adjusted, retainer 26 holds housing 22 axially in place.

Bearings 28 and 30 are positioned in housing 22 and rotatably support spindle 32 therein. Snap ring 34 is engaged in a suitable snap ring groove at the forward end of the spindle and engages against the front of ball bearing 30. Spacer 36 engages against the back of ball bearing 28. Pulley 38 is keyed on the rear of spindle 32 and is held in place by retainer ring 40. Retainer ring 40 may be screwed on the rear end of the spindle or maintained in place by a clamp screw or a set screw. By moving retainer ring 40 forward on spindle 32, drive pulley 38 is held in place, and the bearings are preloaded. By this means, spindle 30 is mounted for accurate rotation.

The forward end of spindle 32 is accurately ground to form a face 42 which serves as a stop face. Nut 44 screws onto the front end of the spindle and has radially inwardly directed flange 46 which has an accurately ground interior surface 47 which faces axially inwardly and engages axially on spindle stop face 42. The front face 48 of nut 44 is in the plane perpendicular to the rotational axis of the spindle and is accurately dimensional with or without interior surface 47 so as to serve as a tooling reference plane. It is this tooling reference plane that is adjusted in location with respect to the front face of spindle carrier 18, and thus each of the spindles is adjusted so that its front face lies in the tooling reference plane. In this way, critical adjustment of the position of the spindle 32 can be readily obtained and, as will be explained, provides accurate location of the workpiece. It should also be further noted that it is adjustment ring 24 clamped in place by retainer 26 that holds the entire spindle assembly in place so that the spindle assembly can be readily and quickly removed and replaced.

Collet closer 50 is axially, slidably movable in the accurate cylindrical interior bore in spindle 32. Collet closer 50 is urged to the right, toward the collet-closing position by means of collet-closing spring 52 which is engaged interiorly of spindle 32 and around the drawbar portion of the collet closer. Since the collet closing spring 52 urges collet closer 50 to the right to urge the collet closed, the collet is a normally closed collet because it remains in the collet closed position unless an externally applied opening force is applied to collet closer 50 to draw the collet closer away from its collet closing effort. Thus, the structure provides for a normally closed collet. The forward end of collet closer 50 has an interior conical surface 54. The conical surface is concentric with the spindle rotative axis. Collet 56 has a forward workpiece engaging bore 58 and, exterior thereto, a conical outer engagement surface 60 which is engaged by the interior surface 54 of collet closer 50. The forward end of the collet 56 is slotted and is stressed so that, when it is not engaged, it springs open enough to permit the placement and removal of workpieces from bore 58. The rear end of collet 56 fits closely within the bore in the collet closer to maintain concentricity of the collet. Collet spring 62 thrusts the collet forward to the right in FIG. 4 so that the front reference surface 64 (see FIG. 5) is resiliently thrust against the interior reference surface 47 of flange 46 so that it is in line with spindle end face 42. Collet spring 62 maintains the engagement of the front reference surface 64 of the collet 56 against the interior of nut 44 to maintain the collet accurately in place at all times. The rear of the collet is concentrically supported in collet closer 50. With spring 52 urging collet closer 50 to the right, the collet is closed on the workpiece so that the structure provides for a normally closed collet, until said external collet opening force is applied.

Drawbar 66 is integrally formed with the back end of collet closer 50 and carries collar 68 on the rear end thereof. As is best seen in FIG. 3, collet opening levers 70 and 72 are pivotally mounted on the inside of front wall 16 and extend downward into the region of the circular arrangemnnt of spindle assemblies. The lower, operating end of the collet operating levers are shaped such that spindle carrier 18 can rotate without interference when the collet operating levers are unactuated. With the collet operating levers out of the way during rotation, rotational speeds are not limited by collet operating bearings and accuracy is not injured by the forces of the system imposed by the collet operating bearings. The and the collet opening levers are positioned behind the drawbar collars 68 of two spindle assemblies when the spindle carrier 18 is in one of its index positions. Connector 74 is engaged in both levers 70 and 72, and connecting rod 76 is attached to connector 74 so that, when the connected rod is axially moved, the collet operating levers are moved against the inner side of the collars on the collet drawbars so that the drawbars are drawn back to relieve the closing pressure on the two collets affected. Connecting rod 76 is attached to lever 73 which is secured to shaft 75. Lever 77 is also attached to shaft 75. An air cylinder (not shown) attached to lever 77 actuates it to swing both of the collet operating levers 70 and 72 from the collet closed position to pull on the drawbars to release the closing force on the collets so that they spring open by their own internal spring stress. As is seen in FIG. 2, collet assembly 20 is actuated by collet opening lever 72, while spindle assembly 78 is positioned to be opened by collet opening lever 70. Of course, both spindle assemblies 78 and 20 are acted on at the same time. Spindle assembly 78 is in the workpiece discharge position or unloading position, while spindle assembly 20 is in the workpiece loading position.

FIG. 5 shows the spindle assembly 78 in the position of releasing and unloading workpiece 80. Unloading of the finished workpiece is assured by ejector rod 82, see FIGS. 4 and 5, which engages behind the workpiece. On its rear end, ejector rod 82 has a head, and ejector spring 84 engages the head to urge the ejector rod to the right. When the finished part is ejected, the face of the ejector rod comes flush with the face of the collet, as shown in FIG. 5. The ejector rod is stopped in this position by any convenient stop means, such as a cross-pin under the head of the ejector rod. The ejector rod is optional, depending on the difficulty of removal of the finished part. At the same time the collet is released and the part is ejected at the unloading station, an airblast is supplied by air tube 86 to blow air into the rear end of the spindle assembly 78 to blow chips and coolant out of the collet and aid in the discharge of the workpiece. Spindle assembly 88, see FIG. 2, is in an idle position, and spindle assembly 20 is in the workpiece loading position. In that position, when collet closer 50 is retracted, a new workpiece is inserted into the collet. The collet 56 is spring-urged to the right to remain in contact with the inside reference face 47 of flange 46 so that the collet is in an accurate position. The workpiece is inserted with suitable accuracy, and the drawbar is released so that collet closer 50 is moved to the right by its spring 52 to close the collet on the workpiece. During the closing operation, there is no axial movement of the collet so that accuracy is maintained.

The mechanism by which spindle carrier 18 is indexed from one index position to the next and is accurately located in the index position is shown in U.S. patent application Ser. No. 580,601, Filed May 27, 1975 for "Positioning and Indexing Apparatus", the entire disclosure of which is incorporated herein. For the purpose of this application, suffice it to say that, when indexing of the spindle carrier from one index position to the next is desired, the spindle carrier is unlocked, is engaged by a drive mechanism which accelerates the spindle carrier from zero speed at the starting index position to a maximum rotative speed about the spindle carrier axis 90 (see FIG. 2), and decelerates it to stop at the next index position. The acceleration and deceleration are substantially constant and substantially equal, such as is achieved by Geneva mechanisms and similar drives. The rotative speed of spindle carrier 18 about its axis and everything carried on the spindle carrier reaches a maximum rotative speed about the axis at a point substantially midway between the index positions.

Drive shaft 92, see FIGS. 1 and 2, is driven from the main prime mover of the machine tool. Drive shaft 92 has pulley 94 thereon which engages with spindle drive belt 96 to drive it in the direction indicated in FIG. 2. As is seen in FIG. 3, drive pulley 38 is toothed, and drive belt 96 is toothed to provide a positive belt drive. Idler 98 carries the belt up between the index positions of spindle assemblies 20 and 100, and the belt extends around spindle assemblies 100, 102, 104, 106, 108, and 110 so each of thes spindle assemblies is driven by the belt. Idler 112 is positioned between spindle assemblies 110 and 114. Idlers 116 and 118 carry the belt back to pulley 94. If another station is required for working on a rotating workpiece, idler 112 can be placed in a position between spindle assemblies 114 and 78. On the other hand, if fewer stations of rotating workpiece are necessary, the belt need not engage and drive so many spindle assemblies by changing the position of the idlers so that perhaps only the spindle assemblies 100, 102, and 104 are driven. Thus, the belt arrangement is adaptable to the particular machining task.

In order to prevent the tremendous stresses on the belt if it is engaged with a pulley at the wrong peripheral speed, the speeds are coordinated. Especially in the case of a toothed belt, if such a toothed belt is engaged with a pulley having a substantially different peripheral speed, the tooth engagement in the tooth pockets of the pulley cause great stresses on the belt and significantly reduce its life. Toothed belts are desirable because of their positive drive capability and high-speed capability. The present invention also contemplates positioning the first idler pulley 98 in a position such that the pulley 38 on the spindle assembly first contacts the drive belt 96 when spindle carrier 18 is rotating at its maximum speed between index positions and arranging that speed so that it substantially matches the peripheral speed of belt 96. The spindle in spindle assembly 20 is non-rotative in spindle carrier 18 in the loading index position, but the angular velocity of spindle carrier 18 midway between the index positions is sufficiently high as to impart a peripheral velocity to drive pulley 38 such that its peripheral velocity substantially matches the peripheral velocity of belt 96 so that speeds are matched. A tooth on the belt finds a companion space on the pulley, and the two are engaged. Now, as spindle carrier 18 slows down as it approaches the next index position, the spindle and the remainder of the rotating structure in spindle assembly 20 is rotatively accelerated with respect to spindle carrier 18 so that, when the spindle carrier reaches and is locked in the next index position, the spindle is rotating, ready for machining. In this way, the belt is engaged with the pulley without shock. This substantially extends belt life. Similarly, idler 112 is positioned midway between index positions so that the belt is released from the spindle assembly when the spindle assembly is non-rotating with respect to spindle carrier 18. In this way, the spindle is decelerated down to zero speed so that neither rundown time nor brake is necessary to stop the spindle when it is desired to unload the part. Thus, braking is also achieved without requiring additional equipment.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A spindle assembly for mounting in a spindle carrier for adjustment with respect to the front wall of the spindle carrier, said spindle assembly comprising:
    a spindle housing, said spindle housing having an external surface for mounting in an opening in the spindle carrier;
    a spindle mounted for rotation on a spindle axis in said spindle housing, said mounting being such that said spindle is axially rigid with respect to said spindle housing;
    an adjustment ring threaded on said spindle housing and extending outwardly from said external surface on said spindle housing so that said adjustment ring can lie against the front wall of the spindle carrier and be clamped with respect thereto and said spindle housing can be adjusted in a direction along said axis with respect to said wall by rotation of said adjustment ring on its threads on said housing.

2. The spindle assembly of claim 1 wherein:
    the external surface of said spindle housing is cylindrical.

3. The spindle assembly of claim 2 wherein:
    said spindle housing has threads on the exterior thereof and said adjusting ring is threadably engaged on said threads on said spindle housing so that, by rotating said adjusting ring, said adjusting ring is axially moved along said spindle housing to axially position said spindle assembly with respect to the spindle carrier.

4. The spindle assembly of claim 3 further including:
    an axially inwardly facing flange positioned at the front end of said spindle;
    a collet positioned within said spindle and engaged against said flange, said collet being pre-stressed in its opening direction;
    a collet spring on one end engaging said collet and thrusting said collet aginst said flange;
    a collet closer at least partially surrounding said collet and engaging said collet, said collet spring on its other end engaging said collet closer and urging said collet closer in a collet opening direction;
    a collet closing spring positioned behind said collet closer to thrust said collet closer into engagement with said collet to urge said collet in a closing direction, said collet closing spring being stronger than said collet spring so that said collet is closed in the absence of collet opening force; and
    means connected to said collet closer for withdrawing said collet closer aginst said collet closing spring for permitting said collet to open.

5. The spindle assembly of claim 4 wherein:
    said collet closing spring is positioned within said spindle.

6. The spindle assembly of claim 5 wherein:
    a drawbar extends out of said spindle for engagement for withdrawing said collet closer away from said collet to permit said collet to release a workpiece therein.

7. A spindle assembly comprising:
    a spindle housing;
    a spindle mounted for rotation within said housing on a spindle axis and for axial rigidity along said axis, said spindle having a front spindle face and an interior bore within said spindle extending to said spindle face;

a collet closer positioned within said spindle bore for axial movement within said spindle through said spindle bore;

a collet closing spring engaged against said collet closer to thrust said collet closer toward said spindle face, a collet closing surface in said collet closer;

an inwardly directed flange at the front of said spindle having an axially facing interior surface engaged against said spindle face, said spindle face and said interior surface of said flange forming a reference plane;

a collet positioned within said spindle, said collet having a flat engagement face adjacent its front end;

a collet spring engaged against said collet closer on one end and engaged against said collet on the other end and resiliently forwardly thrusting said collet so that said flat engagement face on said collet engages with said interior face of said flange to resiliently thrust said flat engagement face of said collet against said flange in said reference plane, said collet having an outer engagement surface thereon for engagement by said collet closing surface of said collet closer, said collet closing spring being stronger than said collet spring so that forward motion of said collet closer from thrust of said collet closer spring causes collet closing;

a drawbar secured to said collet closer to selectively retract said collet closer against the force of said collet closing spring so that said collet can open to release a workpiece therein;

said spindle housing has a cylindrical exterior surface having an axis lying on said spindle axis and said spindle housing has threads on said cylindrical exterior surface; and an adjustment ring threadedly engaged on said threads on said spindle housing, said adjustment ring having a stop surface thereon so that, when said spindle assembly is positioned in an opening in a spindle carrier, said stop ring engages against the spindle carrier to positively axially locate said spindle assembly with respect to the spindle carrier and so that said adjustment ring can be clamped with respect to the spindle carrier for clamping said spindle assembly into the spindle carrier.

* * * * *